United States Patent
Grigera (10) Patent No.: US 9,230,134 B1
(45) Date of Patent: Jan. 5, 2016

(54) PRIVACY SETTING METADATA FOR APPLICATION DEVELOPERS

(71) Applicant: GOOGLE INC., Mountain View, CA (US)

(72) Inventor: Alejo Grigera, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 94 days.

(21) Appl. No.: 14/158,656

(22) Filed: Jan. 17, 2014

(51) Int. Cl.
*G06F 7/04* (2006.01)
*G06F 21/62* (2013.01)

(52) U.S. Cl.
CPC .... *G06F 21/6245* (2013.01); *G06F 2221/2141* (2013.01)

(58) Field of Classification Search
CPC .............. G06F 21/577; G06F 21/6218; H04L 63/1408; H04L 63/1416; H04L 63/145; H04L 63/20
USPC ....................................................... 726/26–27
See application file for complete search history.

(56) References Cited

U.S. PATENT DOCUMENTS

| | | | |
|---|---|---|---|
| 7,392,546 B2* | 6/2008 | Patrick | 726/26 |
| 7,610,048 B2 | 10/2009 | Ross et al. | |
| 8,255,991 B1 | 8/2012 | Hackborn et al. | |
| 8,332,936 B1 | 12/2012 | Hackborn et al. | |
| 8,495,619 B2 | 7/2013 | Tammana | |
| 8,595,489 B1* | 11/2013 | Faaborg et al. | 713/166 |
| 8,844,036 B2* | 9/2014 | Saidi et al. | 726/23 |
| 2012/0036360 A1* | 2/2012 | Bassu | H04L 9/3228 713/168 |
| 2012/0317565 A1 | 12/2012 | Carrara et al. | |
| 2013/0067456 A1 | 3/2013 | Khilnani et al. | |
| 2013/0111545 A1* | 5/2013 | Sharma | H04L 63/10 726/1 |
| 2013/0174211 A1* | 7/2013 | Aad | G06F 21/604 726/1 |
| 2013/0185804 A1* | 7/2013 | Biswas | G06F 21/577 726/26 |
| 2013/0247030 A1 | 9/2013 | Kay et al. | |
| 2013/0268676 A1* | 10/2013 | Martins et al. | 709/226 |
| 2014/0059695 A1* | 2/2014 | Parecki | G06F 21/60 726/26 |
| 2014/0096246 A1* | 4/2014 | Morrissey | G06F 21/51 726/23 |
| 2014/0325057 A1* | 10/2014 | Borawski et al. | 709/224 |

OTHER PUBLICATIONS

Jerry Hildenbrand, "Android app permissions—How Google gets it right . . . " Feb. 16, 2012.*

(Continued)

*Primary Examiner* — Samson Lemma
(74) *Attorney, Agent, or Firm* — Procopio, Cory, Hargreaves & Savitch LLP (57) ABSTRACT

Privacy setting metadata for application developers is described, including receiving, from a user, a request to submit an application; requesting, from the user, identification of one or more permissions and information associated with the one or more permissions; receiving the application, the one or more permissions, and the information associated with the one or more permissions, wherein the one or more permissions are associated with one or more functions of the application; storing the application, the permissions, and the information associated with the permissions; receiving a request to install the application to a device of another user; providing the application, the one or more permissions, and the information associated with the one or more permissions to the device; and receiving, from the device, one or more consents to the one or more permissions, the one or more consents indicate activation of the one or more functions of the application.

20 Claims, 6 Drawing Sheets

(56) References Cited

OTHER PUBLICATIONS

Working with AndroidManifext.xml, Xamarian Developer Center, [online] [retrieved Oct. 18, 2013] URL: http://docs.xamarin.com/guides/android/advanced_topics/working_with_androidmanifest.xml/ 5 pgs.

The AndroidManifest.xml File, Android Developers, [online] [retrieved on Nov. 25, 2013] URL: http://developer.android.com/guide/topics/manifest/manifest-intro.html 7 pgs.

Manifest.permission, Android Developers, [online] [retrieved on Nov. 25, 2013] URL: http://developer.android.com/reference/android/Manifest.permission.html, 33 pgs.

Lomas, N., Android 4.3 Includes Hidden App Permissions Manager That Could Bolster Privacy & Security, www.google.com, Jul. 26, 2013, 2 pgs [online] [retrieved on Apr. 20, 2015] URL: http://techcrunch.com/2013/07/26/android-app-ops/, Sep. 27, 2015.

International Search Report and Written Opinion for PCT/US2015/011635 dated Apr. 30, 2015, 11 pgs.

* cited by examiner

PRIVACY SETTING METADATA FOR APPLICATION DEVELOPERS

BACKGROUND

1. Field

The subject matter discussed herein relates generally to providing an application and, more particularly, to privacy setting metadata for application developers.

2. Related Background

A software developer writes or develops, for example, an application (also referred to as an "app") for associating users having a common interest. The app needs to access a wide variety of data about users of the app, such as a user's name, phone number, location, profile info, etc., which are crucial for making the associate between the users. However, there is no mechanism for the developer to tell users who install the app why the data are needed and to obtain meaningful permissions or consents from the users to gather and/or use the data.

In some development platforms, such as, but not limited to, the Android™ platform, a developer may describe the functionality and requirements of an application using predefined categories provided in that platform (e.g., using the Manifest.permission class). When the application is compiled, a separate file (e.g., AndroidManifest.xml) is generated. At installation, both the app and the associated AndroidManifest.xml need to be present. The predefined categories selected by the developer at the time of development are presented to users who install the app.

However, the predefined categories may be too broad, and it may not be possible for the installing user to be informed that only a portion of the category is applied. For example, even if the application needs to only take screenshots and applies filters to the screenshots, a predefined category may indicate that the app needs to "Access all of your data on the web," which includes more than the screenshots. A prospective user may be influenced by such a broad category and refrain from installing or using the application.

SUMMARY

The subject matter includes methods for implementing privacy setting metadata for application developers, including receiving, from a user, a request to submit an application; requesting, from the user, identification of one or more permissions and information associated with the one or more permissions; receiving the application, the one or more permissions, and the information associated with the one or more permissions, wherein the one or more permissions are associated with one or more functions of the application; storing the application, the permissions, and the information associated with the permissions; receiving a request to install the application to a device of another user; providing the application, the one or more permissions, and the information associated with the one or more permissions to the device; and receiving, from the device, one or more consents to the one or more permissions, the one or more consents indicate activation of the one or more functions of the application.

The methods are implemented using one or more computing devices and/or systems. The methods may be stored in computer-readable media.

DETAILED DESCRIPTION

The subject matter described herein is taught by way of example implementations. Various details have been omitted for the sake of clarity and to avoid obscuring the subject matter. The examples shown below are directed to structures and functions for implementing privacy setting metadata for application developers.

Figure 1:
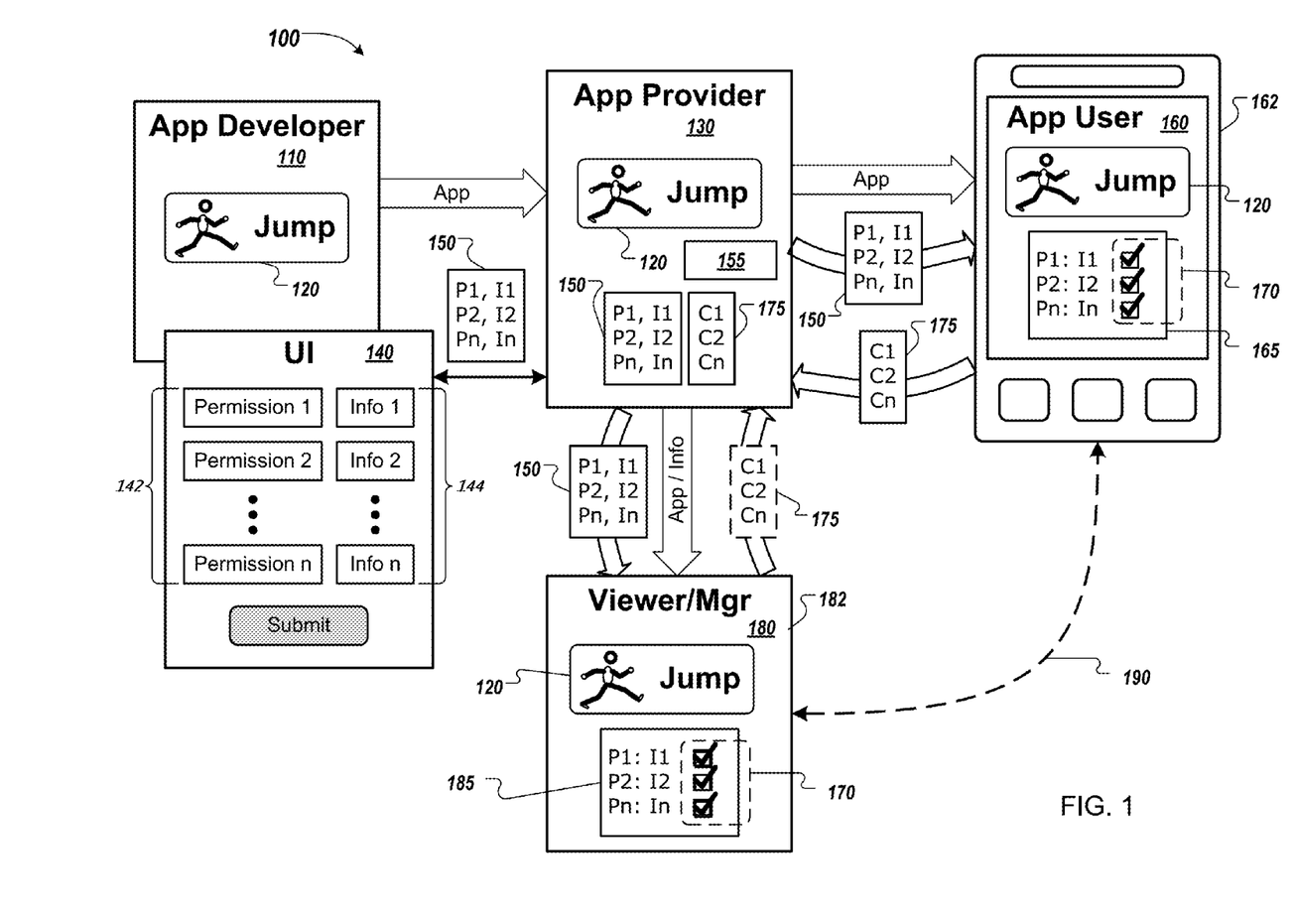
FIG. 1 shows an example environment where an application may be released according to some example implementations.

FIG. 1 shows an example environment where an application may be released according to some example implementations. Environment 100 includes at least one application developer 110 who develops or otherwise publishes or releases an application (e.g., app 120, entitled "Jump") to app users 160. In environment 100, applications may be released through an intermediary, such as an application distributor, a website, or an application store (e.g., an app provider 130), from which one or more app users 160 may obtain or download applications (e.g., app 110).

A process of releasing an application (e.g., application 120) to app provider 130 may include the app developer 110 issuing a request (e.g., via a website of app provider 130) to submit the application to app provider 130 (e.g., app developer 110 may be registered as a user to app provider 130 before submitting application 120). App provider 130 may provide a user interface (UI) 140 for app developer 110 to provide information 142 and 144. Information 142 may include one or more fields (e.g., first name) and a description of what the fields are intended to be used by the application 120. Information 144 may describe or identify the permissions or consents sought or requested. An example of UI 140 is shown in FIG. 2A.

Figure 2A:
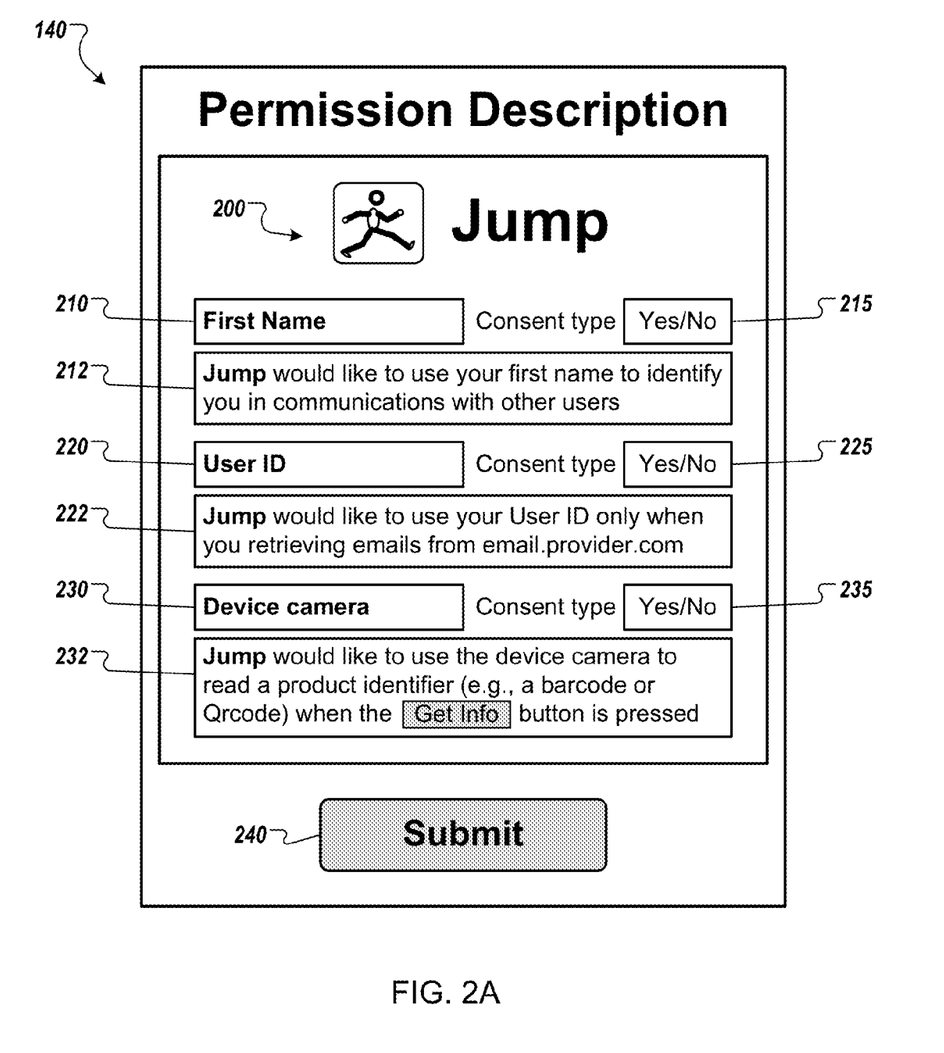
FIG. 2A shows an example user interface for submission of applications.

FIG. 2A shows an example user interface that may be presented to app developer 110 for submission of application 120. When app developer 110 requests to submit application 120, UI 140 may be provided by app provider 130 for app developer 110 to enter or provide information 210-235, for example, based on functions of application 120. For example, application 120 is an application that may use a user's first name (field 210) for the purpose described in description 212. Permission or consent to use the user's first name (field 210) may be of a "Yes/No" type (e.g., the user indicates either a "Yes" to allowing his or her first name to be used according to description 213 or "No" to withhold consent). Similarly, consents for the field 220 (e.g., a user identifier, identification, or ID) and description 222 pair and field 230 (e.g., using a device's feature, such as a camera) and description 230 pair are of the "Yes/No" permission type.

In some implementations, there may be other types of consents or permissions, such as per-use permissions, conditional permissions, time-based permissions, etc. For example, information 144 (FIG. 1), which identifies consent types 215, 225, and 235 may include a per-user consent (not shown), which means the user of application 120 may be asked for permission again each time a certain event occurs (e.g., each time the user's first name is shared with another new user). Information 144 may include a conditional permission (not shown), which means the consent is valid only if one or more conditions are met. Information 144 may include a time-based permission, which means the permission is only valid within one or more time periods. One or more of the time periods may be defined by the app developer 110 or user of application 120.

The labels of fields 210, 220, and 230 may refer to atomic information, a subcategory of information, and/or a category of information. As used herein, the term "atomic information" refers to a piece of information that is in the smallest form based on use by an application. For example, a person's name (e.g., a field labeled "name") may be an atomic information if an application that uses and/or generates (collectively referred to as "uses") the name field uses it as a whole and does not break down the name into parts, such as first name and last name (i.e., this application does not use just a first name or a last name of the name). In another application that may use a first name and/or a last name of a user, the "name" field, with respect to that application, may be a subcategory of information or a category of information because a name includes a first name and a last name that may be used separately.

The atomic information in some fields (e.g., the fields labeled "network access" and "camera," etc.) may be defined by the description of the fields (e.g., description 212, 222, and/or 232). For example, a camera of a device has many uses (e.g., capture images for storage, detecting light, capturing text, capturing codes, etc.). The description 232 describes a limited use (e.g., "to read a product identifier") and/or a use under a condition (e.g., "when the 'Get Info' button is pressed") for the field of "Device camera" 230. The description 232 defines the field 230 as atomic information or subcategory of information.

When the user of UI 140 (e.g., app developer 110) selects the submit button 240 or the like, identification of one or more permissions (e.g., 215, 225, and 235) and information associated with the one or more permissions (e.g., 210, 212, 220, 222, 230, and 232) is sent to app provider 130 as metadata 150, FIG. 1. Metadata 150 is data of or about permission(s) 142 (e.g., P1, P2, . . . , Pn) and information 144 (e.g., I1, I2, . . . , In). App developer 110 may use UI 140 to provide updated information 142-144. For example, a different version of application 120 may need one or more new consents. App developer app developer 110, when requests to upload the new version of application 120, may provide the updated information 142-144 associated with the new version of application 120.

Referring back to FIG. 1, UI 140 sends information metadata 150 to app provider 130. If application 120 has not been sent or uploaded to app provider 130, it may be done so at this time or at any time (e.g., before, during, or after metadata 150 is sent to app provider 130). App provider 130 store the application 120 and associated metadata 150.

App provider 130 may be a service provider that provides one or more applications to users for a fee or no fee. If fees are collected (e.g., for application 120) a portion or all of the collected fees may be provided to the developers (e.g., app developer 110). When a prospective user or an existing user (referred here as app user 160) requests to view or download application 120 (e.g., for installing on device 162), app provider 130 provides metadata 150 to device 162 for presenting to app user 160.

Device 162 may present metadata 150 in a UI 165. UI 165 is described further in FIG. 2B below. Consent or permission information (e.g., consent types 215, 225, and 235, FIG. 2A) may be presented using widgets 170 (e.g., check boxes for "Yes/No" permissions) for app user 160 to provide or enter his or her consents or permission. Device 162 may not need to provide consents to all information described in metadata 150. When one or more consents that are necessary are to be given by device 162 (e.g., checking the check boxes 170), the consents 175 (e.g., C1, C2, . . . , Cn) are transmitted or sent to app provider 130. App provider 130 determines that all the necessary consents are received from 162 and then provides application 120 to device 162 (e.g., for installation).

In some implementations, application 120 may be provided earlier (e.g., when metadata 150 is sent to device 162. Metadata 150 may indicate the necessary consents. Device 162 may determine that the necessary consents are entered by app user 160 before installing application 120. In some implementations, application 120 may provide functionalities based on the given consents. For example, one or more functions of application 120 may be enabled or disabled based on the present or absent of consents associated with the functions.

In some implementations, app provider 130 may include a database 155 that stores information that indicates which applications and which versions of the applications have been provided to which users and/or which devices. Database 155 may include which consents have been given by which users for which devices, features list of devices, etc. Information stored in database 155 may be used to determine that some installations are subsequent installations, installation in additional devices, or update installations (collectively referred to as subsequent installations). In subsequent installations, app provider 130 may provide a subset of the metadata 150 based on or catered to a subsequent installation.

For example, database 155 may indicate that device 162 is a second device of app user 160, who has previously installed application 120 to another device (not shown). Device 162 has a new feature (e.g., additional processor, a different processor, a camera, additional camera, a new capability, such as communication capability, etc.) that another device does not have. Since the another device does not have, for example, a camera, when metadata 150 was sent to the another device, the field of "Device camera" 230 and corresponding description 232 and consent type 235 were not sent to the another device and were not presented to app user 160 to request his or her consent to using the camera of the another device because it does not have a camera.

However, when a subsequent installation request is received by app provider 130, which may receive indication of a camera or determine that device 162 has a built-in camera, metadata 150 sent to device 162 includes the field of "Device camera" 230 and corresponding description 232 and consent type 235. If consent to the use of the camera is necessary, the consent is provide and returned (e.g., in consents 175) to app provider 130 before application 120 can be installed on device 162, granting application 120 to use the built-in cameral of device 162 for the purpose described in 232.

Figure 2B:
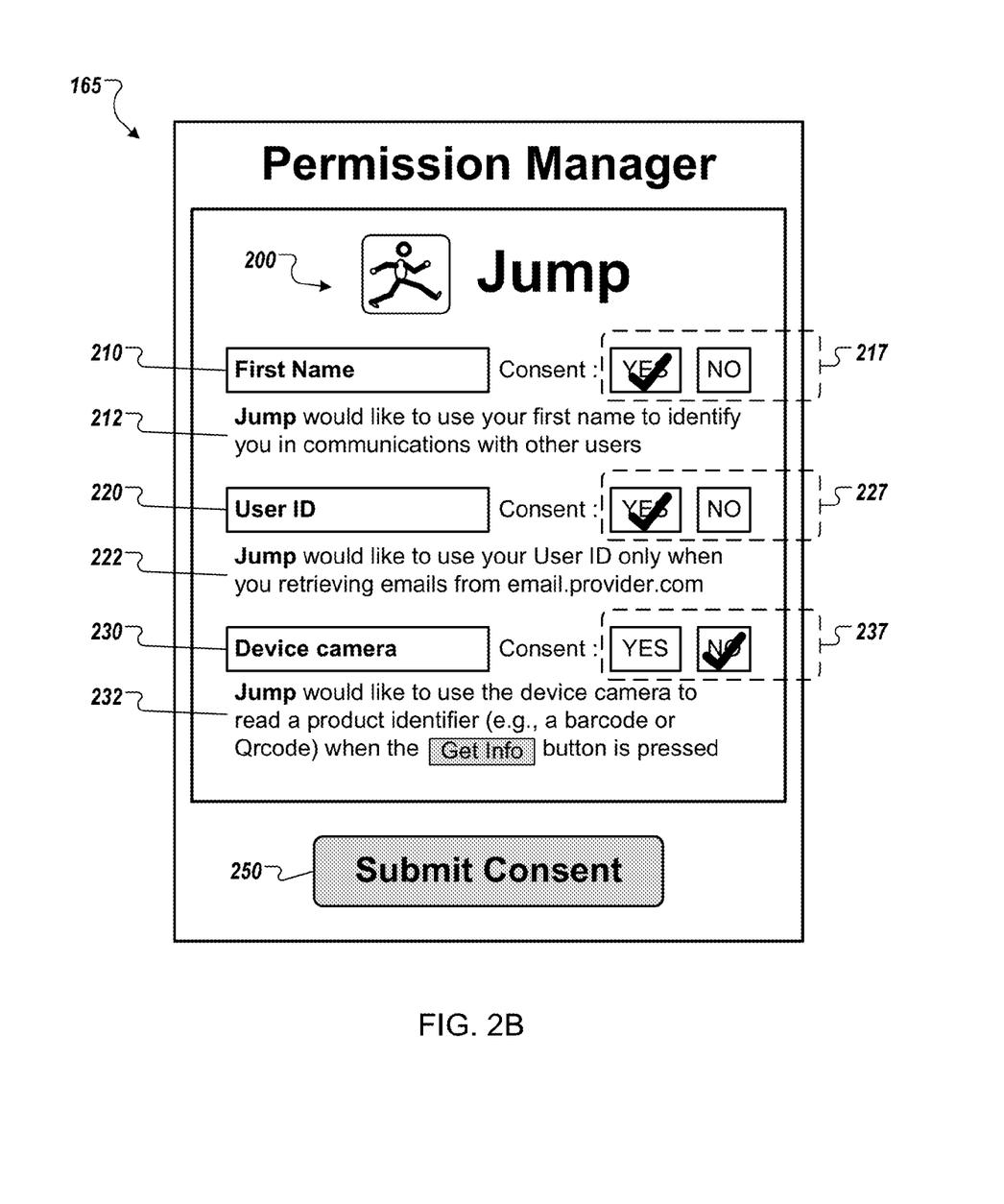
FIG. 2B shows an example user interface for providing consent to an application.

FIG. 2B shows an example user interface for providing consent to an application. Example UI 165 provides metadata 150 as information associated with the one or more permissions (e.g., fields 210, 220, and 230 and description 212, 222, and 232). Widgets 170 may be shown as controls 217, 227, and 237 for app user 160 to provide input by selecting a "Yes" box or a "No" box instead of checking a box or not checking the box. When control 250 is pressed, consents 175 are sent to app provider 130. After installation of application 120, app user 160 may use UI 165 to manage consents (e.g., withhold a consent previously given and/or given a new consent). The updated consents 175, when received by app provider 130, are provided to device 162 to configure application 120 accordingly. For example, the withheld consent may disable a function that requires the consent to operate or disable application 120 if the withheld consent is a necessary consent. The new consent may enable a function that requires the consent to operate.

Referring back to FIG. 1, a user (e.g., app user 160) may use another device 182 (e.g., a device that application 120 may not have been developed to run on, such as a laptop device) to view information about application 120, provide consents for device application 120, and/or store application 120 for installing on device 162 through, for example, a link or path 190. When a request for application 120 or information about application 120 is received by app provider 130 from device 182, metadata 150 may be provided. Application 120 may also be provided, depending on implementations.

If device 182 is implemented to allow user app user 160 to provide consents, UI 185 (e.g., similar to UI 165) may be presented with metadata 150. Likewise, widgets 170 may be to allow app user 160 to enter consents 175, which are sent to app provider 130. Before providing metadata 150 to device 182, input describing device 162 or another device, on which application 120 is intended to be installed, may be requested by and/or provided to app provider app provider 130, so that appropriate set of metadata 150 may be provided to device 182 (e.g., providing information about a device camera and gather consent to use the device camera if the device intended to install application 120 has a camera).

Figure 3:
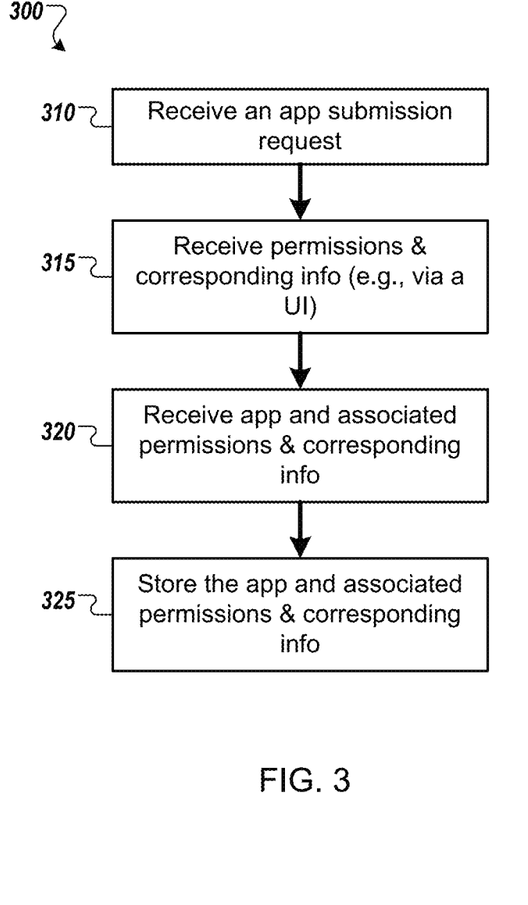
FIG. 3 shows an example of a process implementation for uploading an application.

FIG. 3 shows an example of a process implementation for uploading an application. Process 300 includes, for example, blocks 310-325. At block 310, a request to submit an application (e.g., application 120) is received from a user (e.g., app developer 110). The request may be any trigger to ask app developer 110 to provide information 142-144, FIG. 1, or 210-235, FIG. 2A. In some implementations, app developer 110 does not need to make any explicit request and/or app provider 130 does not need to provide any mechanism (e.g., UI 140) to gather the information 142-144. App developer 110 may simply submit or upload application 120 and information 142-144 to app provider 130.

In other implementations, as described herein, app provider 130, at block 315, may provide UI 140 to gather or request from app developer 110 identification of one or more permissions and information associated with the one or more permissions (e.g., information 142-144, FIG. 1, or 210-235, FIG. 2A). At block 320, app provider 130 receives the application, the one or more permissions, and the information associated with the one or more permissions. In some implementations, application 120 may be sent or uploaded to app provider 130 separately from the information 142-144.

One or more permissions may be associated with one or more functions of the application 120. If a function is necessary function (e.g., no option to disable or not use the function), then a permission or consent to operate that function is necessary. If the necessary consent is not given to a user (e.g., app user 160), application 120 is not made available to download, not allowed to be installed, or not allowed to be executed until the necessary consent is given and received (e.g., by app provider 130). If a function is not a necessary function (e.g., the function may be enabled or disabled), the presence or absence of a permission or consent to operate that function renders the function available (enabled) or not available (disabled), respectively.

At block 325, app provider 130 may store the application, the one or more permissions, and the information associated with the one or more permissions. In some implementations, app provider 130 may manage application 120 without storing the application. For example, when all necessary consents are received, app provider 130 may indicates to app developer 110 or another party (not shown) to provide application 120 to app user 160.

In some examples, process 300 may be implemented with different, fewer, or more blocks. Process 300 may be implemented as computer executable instructions, which can be stored on a medium, loaded onto one or more processors of one or more computing devices, and executed as a computer-implemented method.

Figure 4:
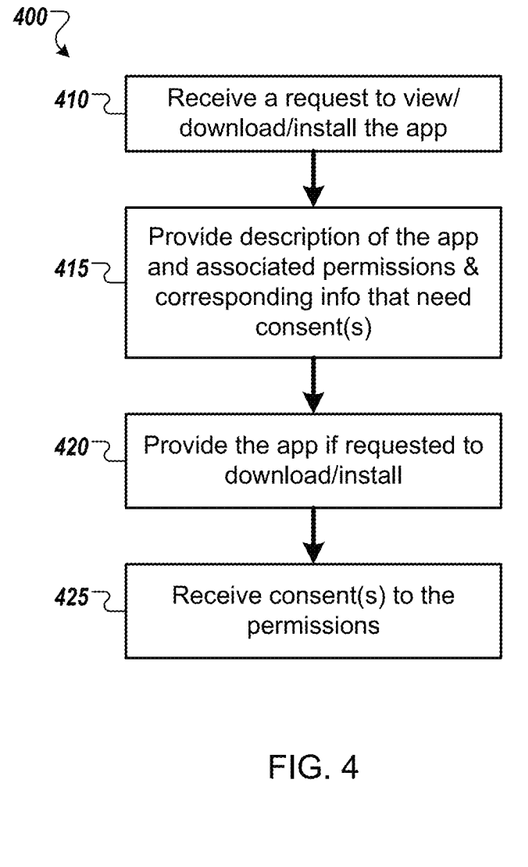
FIG. 4 shows an example of a process implementation for downloading an application.

FIG. 4 shows an example of a process implementation for downloading an application. Process 400 includes, for example, blocks 410-425. At block 410, a request to view, download, or install an application (e.g., application 120) is received by, for example, app provider 130. The request is from a user other than app developer 110. The request may be from, for example, device 162 or device 182, as described in FIG. 1. At block 425, the one or more permissions, and the information associated with the one or more permissions are provided to the requesting device. At block 420, the application (e.g., application 120) may be provided. In some implementations, the application may be provided at block 415. At block 425, one or more consents to the one or more permissions are received. In some implementations, the application is not provided until the consents to use the application are received. The consents, if necessary, are provided to operate or user the application. If one or more consents are not necessary consents, but are needed to active or enable certain functionality or functions of the application, the presence of these may consents turn on, activate, or otherwise enable the associated functions. The absence of these consents may turn off, deactivated, or otherwise disable the associated functions.

In some examples, process 400 may be implemented with different, fewer, or more blocks. Process 400 may be implemented as computer executable instructions, which can be stored on a medium, loaded onto one or more processors of one or more computing devices, and executed as a computer-implemented method.

Figure 5:
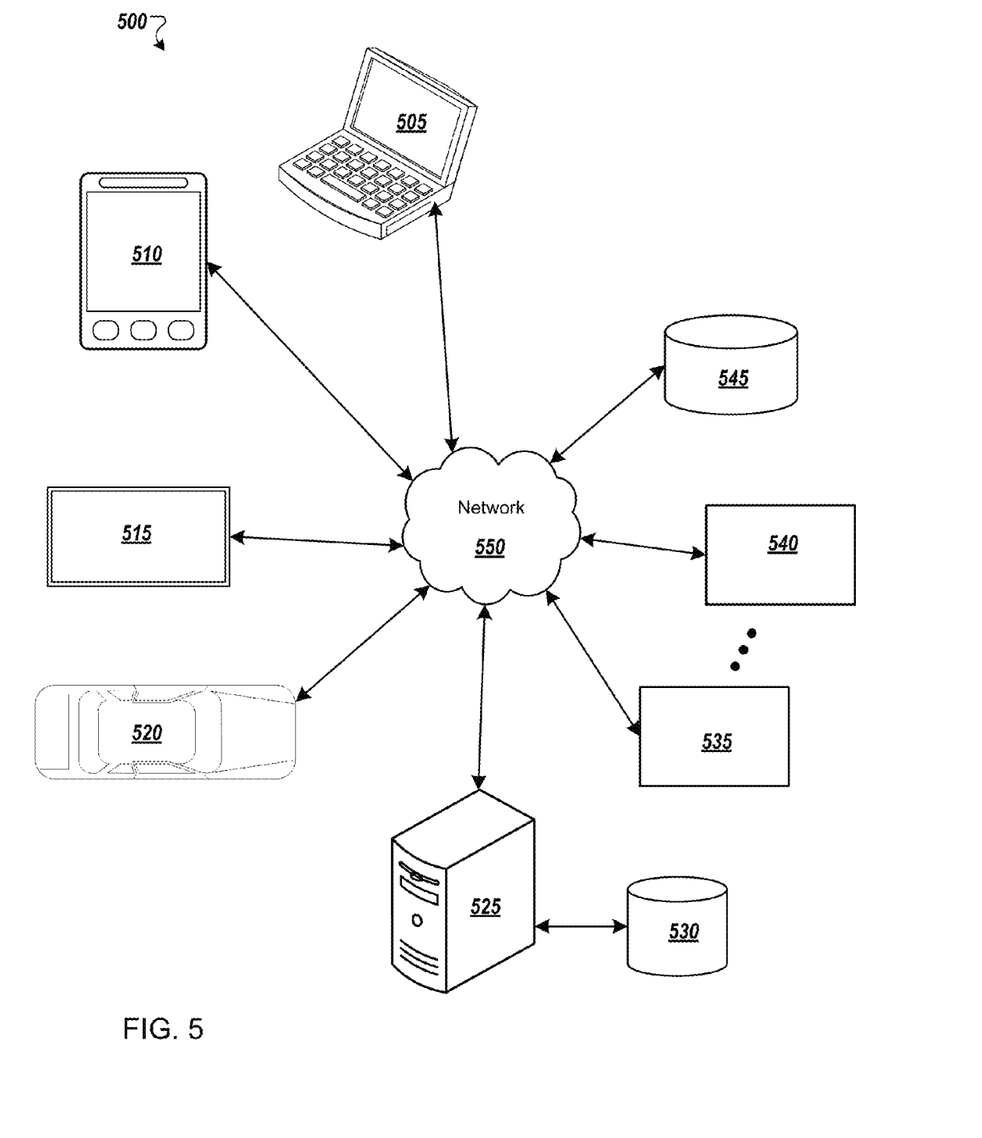
FIG. 5 shows an example environment suitable for some example implementations.

FIG. 5 shows an example environment suitable for some example implementations. Environment 500 includes devices 505-545, and each is communicatively connected to at least one other device via, for example, network 560 (e.g., by wired and/or wireless connections). Some devices may be communicatively connected to one or more storage devices 530 and 545.

An example of one or more devices 505-545 may be computing device 605 described below in FIG. 6. Devices 505-545 may include, but are not limited to, a computer 505 (e.g., a laptop computing device), a mobile device 510 (e.g., smartphone or tablet), a television 515, a device associated with a vehicle 520, a server computer 525, computing devices 535-540, storage devices 530 and 545.

In some implementations, devices 505-520 may be considered user devices (e.g., devices used by app developer 110 and/or app user 160. Devices 525-545 may be devices associated with service providers (e.g., used by service providers to provide services, provide applications, and/or store applications and data, such as application 120, metadata 150, records 155, consents 175, etc.). Devices 525-545 may be used by app developer 110 and/or app provider 130.

For example, device 510 may be device 162 in FIG. 1. A user (e.g., app user 160) may use device 510 to request application 120 from app provider 130, using one or more devices 525-545. App provider 130 may provide application 120 to app user 160 on device 510 as described above.

Figure 6:
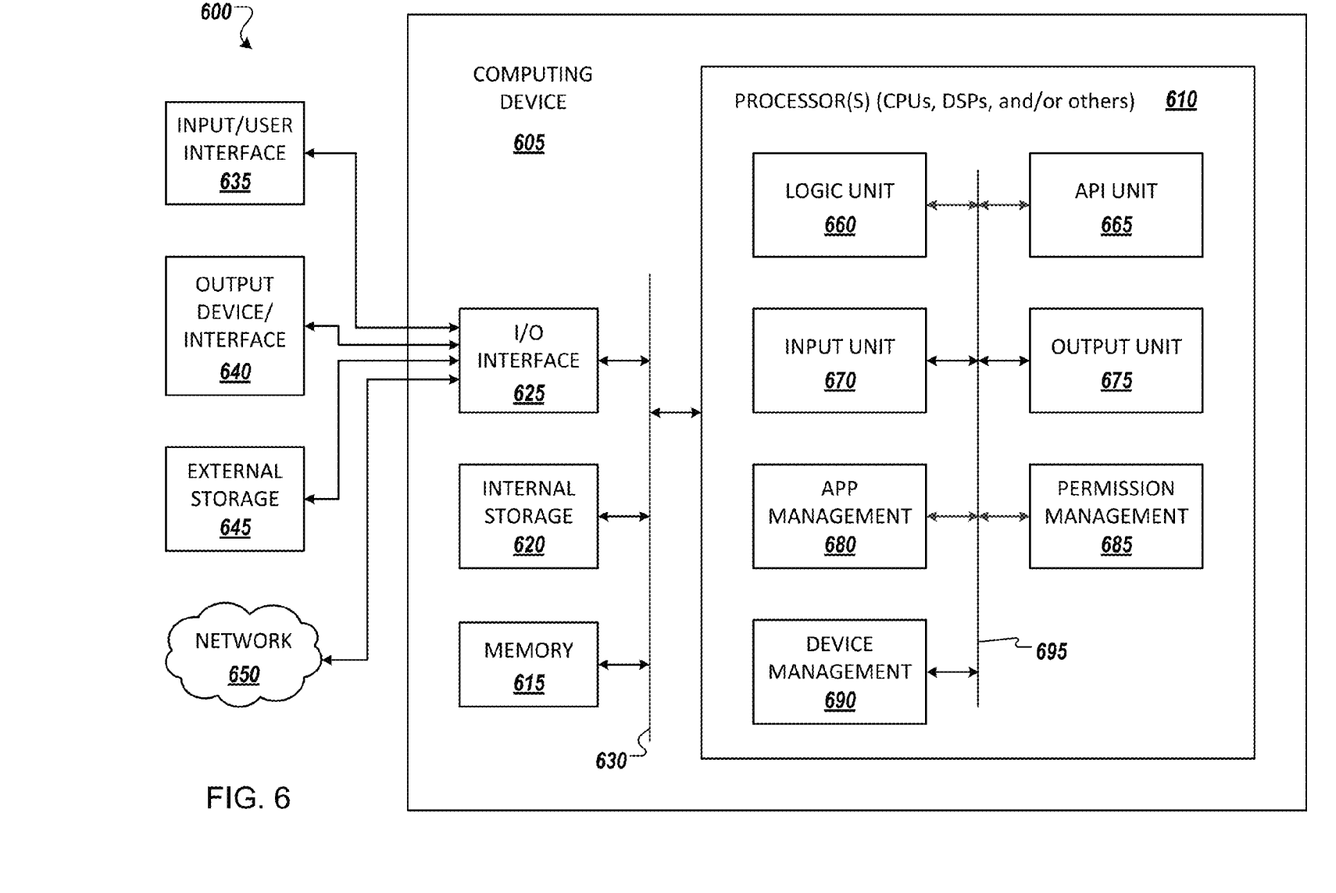
FIG. 6 shows an example computing environment with an example computing device suitable for use in some example implementations.

FIG. 6 shows an example computing environment with an example computing device suitable for use in some example implementations. Computing device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computing device 605.

Computing device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computing device 605. In other example implementations, other computing devices may function as or provide the functions of input/user interface 635 and output device/interface 640 for a computing device 605.

Examples of computing device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 605 can be communicatively coupled (e.g., via I/O interface 625) to external storage 645 and network 650 for communicating with any number of networked components, devices, and systems, including one or more computing devices of the same or different configuration. Computing device 605 or any connected computing device can be functioning as, providing services of, or referred to as a server, client, thin server, general machine, special-purpose machine, or another label.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, app management 680, permission management 685, device management 690, and inter-unit communication mechanism 695 for the different units to communicate with each other, with the OS, and with other applications (not shown). For example, app management 680, permission management 685, and device management 690 may implement one or more processes or UI shown and described in FIGS. 1-5. The described units and elements can be varied in design, function, configuration, or implementation and are not limited to the descriptions provided.

In some example implementations, when information or an execution instruction is received by API unit 665, it may be communicated to one or more other units (e.g., logic unit 660, input unit 670, output unit 675, app management 680, permission management 685, and device management 690). For example, when app management 680 detects a request to upload an application (e.g., application 120) from information receive through input unit 670, permission management 685 is called by API unit 665 to provide UI 140 to gather metadata 150. When device management 690 receives a request to view, download, or install application 120 through input unit 670, device management 690, though output 675, provides information about application 120 and metadata 150. Device management 690 may wait for consents 175 to be received before providing application 120 device. In some implementations, device management 690 may determine that consents 175 are all the necessary consents before providing application 120 to the requesting device.

In some instances, logic unit 660 may be configured to control the information flow among the units and direct the services provided by API unit 665, input unit 670, output unit 675, app management 680, permission management 685, and device management 690 in some example implementations described above. For example, the flow of one or more processes or implementations may be controlled by logic unit 660 alone or in conjunction with API unit 665.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising:
   receiving, from a first device that is associated with a user, a request to submit an application;
   requesting, from the user associated with the first device, identification of one or more permissions and information associated with the one or more permissions;
   receiving the application, the one or more permissions, and the information associated with the one or more permissions, wherein the one or more permissions are associated with one or more functions of the application;
   storing, in an online storage device, the application, the one or more permissions, and the information associated with the one or more permissions;
   receiving, at a second device associated with another user, a request to install the application;
   providing, by a server with a hardware processor, the application, the one or more permissions, and the information associated with the one or more permissions, to the second device;
   receiving, from the second device, one or more consents to the one or more permissions, the one or more consents indicate activation of the one or more functions of the application;
   storing, in the online storage device, versions of the application, information regarding hardware features provided by the second user device and a third user device that are both associated with the another user; and
   for the second user device having different hardware features from the third user device, the server with the hardware processor providing the second user device with a first set of the permissions based on the hardware features of the second user device, and providing the third user device was a second set of the permissions based on the hardware features of the third user device.

2. The method of claim 1, wherein the requesting identification of one or more permissions and the information associated with the one or more permissions comprises providing a user interface configured to gather the one or more permissions and the information associated with the one or more permissions.

3. The method of claim 1, wherein the receiving the application, the one or more permissions, and the information associated with the one or more permissions comprises receiving the one or more permissions and the information associated with the one or more permissions from a user interface.

4. The method of claim 1, further comprising:
   receiving another request to install the application to the third device associated with the another user;
   determining that the one or more permissions do not include a prescribed permission;
   providing the application, the prescribed permission, and information associated with the prescribed permission; and
   receiving a consent to the prescribed permission.

5. The method of claim 4, wherein the determining that the one or more permissions do not include the prescribed permission comprises:
   determining the third device includes a feature not found on the second device, where the feature is associated with the prescribed permission.

6. The method of claim 1, further comprising:
   receiving another request to install the application to the second device;
   determining that the one or more permissions do not include a prescribed permission;
   providing the application, the prescribed permission, and information associated with the prescribed permission; and
   receiving a consent to the prescribed permission.

7. The method of claim 6, wherein the determining that the one or more permissions do not include the prescribed permission comprises:
   determining that the prescribed permission is associated with a new version of the application that is available after the providing, to the second device, the application in a previous version.

8. A non-transitory computer readable medium having stored therein computer executable instructions for:
   receiving, from a first device that is associated with a user, a request to submit an application;
   requesting, from the user associated with the first device, identification of one or more permissions and information associated with the one or more permissions;
   receiving the application, the one or more permissions, and the information associated with the one or more permissions, wherein the one or more permissions are associated with one or more functions of the application;
   storing, in an online storage device, the application, the one or more permissions, and the information associated with the one or more permissions;
   receiving, at a second device associated with another user, a request to install the application;
   providing, to the device, by a server with a hardware processor, the application, the one or more permissions, and the information associated with the one or more permissions;
   receiving, from the second device, one or more consents to the one or more permissions, the one or more consents indicate activation of the one or more functions of the application;
   storing, in the online storage device, versions of the application, information regarding hardware features provided by the second user device and a third user device that are both associated with the another user; and
   for the second user device having different hardware features from the third user device, the server with the hardware processor providing the second user device with a first set of the permissions based on the hardware features of the second user device, and providing the third user device was a second set of the permissions based on the hardware features of the third user device.

9. The computer readable medium of claim 8, wherein the requesting identification of one or more permissions and the information associated with the one or more permissions comprises providing a user interface for gathering the one or more permissions and the information associated with the one or more permissions.

10. The computer readable medium of claim 8, wherein the receiving the application, the one or more permissions, and the information associated with the one or more permissions comprises receiving the one or more permissions and the information associated with the one or more permissions from a user interface.

11. The computer readable medium of claim 8, further comprising computer executable instructions for:
   receiving another request to install the application to the third device associated with the another user;
   determining that the one or more permissions do not include a prescribed permission;
   providing the application, the prescribed permission, and information associated with the prescribed permission; and
   receiving a consent to the prescribed permission.

12. The computer readable medium of claim 11, wherein the determining that the one or more permissions do not include the prescribed permission comprises:
   determining the third device includes a feature not found on the second device, where the feature is associated with the prescribed permission.

13. The computer readable medium of claim 8, further comprising computer executable instructions for:
   receiving another request to install the application to the second device;
   determining that the one or more permissions do not include a prescribed permission;
   providing the application, the prescribed permission, and information associated with the prescribed permission; and
   receiving a consent to the prescribed permission.

14. At least one computing device comprising storage and a processor configured to perform:
   receiving, from a first device that is associated with a user, a request to submit an application;
   requesting, from the user associated with the first device, identification of one or more permissions and information associated with the one or more permissions;
   receiving the application, the one or more permissions, and the information associated with the one or more permissions, wherein the one or more permissions are associated with one or more functions of the application;
   storing, in an online storage device, the application, the one or more permissions, and the information associated with the one or more permissions;
   receiving, at a second device associated with another user a request to install the application;
   providing, to the device, by a server with a hardware processor, the application, the one or more permissions, and the information associated with the one or more permissions;
   receiving, from the second device, one or more consents to the one or more permissions, the one or more consents indicate activation of the one or more functions of the application;
   storing, in the online storage device, versions of the application, information regarding hardware features provided by the second user device and a third user device that are both associated with the another user; and
   for the second user device having different hardware features from the third user device, the server with the hardware processor providing the second user device with a first set of the permissions based on the hardware features of the second user device, and providing the third user device was a second set of the permissions based on the hardware features of the third user device.

15. The at least one computing device of claim 14, wherein the requesting identification of one or more permissions and the information associated with the one or more permissions comprises providing a user interface for gathering the one or more permissions and the information associated with the one or more permissions.

16. The at least one computing device of claim 14, wherein the receiving the application, the one or more permissions, and the information associated with the one or more permissions comprises receiving the one or more permissions and the information associated with the one or more permissions from a user interface.

17. The at least one computing device of claim 14, wherein the processor is further configured to perform:
   receiving another request to install the application to the third device associated with the another user;
   determining that the one or more permissions do not include a prescribed permission;
   providing the application, the prescribed permission, and information associated with the prescribed permission; and
   receiving a consent to the prescribed permission.

18. The at least one computing device of claim 17, wherein the determining that the one or more permissions do not include the prescribed permission comprises:
   determining the third device includes a feature not found on the second device, where the feature is associated with the prescribed permission.

19. The at least one computing device of claim 14, wherein the processor is further configured to perform:
   receiving another request to install the application to the second device;
   determining that the one or more permissions do not include a prescribed permission;
   providing the application, the prescribed permission, and information associated with the prescribed permission; and
   receiving a consent to the prescribed permission.

20. The at least one computing device of claim 19, wherein the determining that the one or more permissions do not include the prescribed permission comprises:
   determining that the prescribed permission is associated with a new version of the application that is available after the providing, to the second device, the application in a previous version.

* * * * *